United States Patent
Sugiyama

(10) Patent No.: US 6,480,292 B1
(45) Date of Patent: Nov. 12, 2002

(54) PRINTING SYSTEM, CONTROL METHOD THEREFOR, AND RECORDING MEDIUM

(75) Inventor: Hideki Sugiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/236,355

(22) Filed: Jan. 25, 1999

(30) Foreign Application Priority Data

Jan. 26, 1998 (JP) .......................... 10-012683
Aug. 27, 1998 (JP) .......................... 10-241752

(51) Int. Cl.$^7$ .......................................... G06F 15/00
(52) U.S. Cl. ............... 358/1.15; 358/1.16; 358/434; 358/436; 358/1.9
(58) Field of Search ................ 358/1.15, 1.12, 358/1.13, 1.14, 1.16, 434, 435, 408, 402, 403; 710/11, 3; 370/238, 252, 229, 235

(56) References Cited

U.S. PATENT DOCUMENTS

| | | | | |
|---|---|---|---|---|
| 4,703,475 A | * | 10/1987 | Dretzka et al. ............... 370/60 |
| 5,130,986 A | * | 7/1992 | Doshi et al. ................. 370/94.1 |
| 5,157,662 A | * | 10/1992 | Tadamura et al. ........ 370/110.1 |
| 5,193,151 A | * | 3/1993 | Jain .......................... 370/230 |
| 5,247,623 A | * | 9/1993 | Sun ........................... 392/325 |
| 5,280,498 A | * | 1/1994 | Tymes et al. ................ 370/328 |
| 5,453,982 A | * | 9/1995 | Pennington et al. ........ 370/235 |
| 5,467,346 A | * | 11/1995 | Ito et al. ....................... 370/60 |
| 5,519,508 A | * | 5/1996 | Murayama ................... 358/436 |
| 5,537,626 A | * | 7/1996 | Kraslavsky et al. ........ 395/828 |
| 5,539,743 A | * | 7/1996 | Amemiya et al. .......... 370/85.1 |
| 5,550,957 A | * | 8/1996 | Davidson, Jr. et al. ..... 395/114 |
| 5,651,114 A | * | 7/1997 | Davidson, Jr. .............. 358/1.15 |
| 5,727,135 A | * | 3/1998 | Webb et al. ................. 395/113 |
| 5,758,070 A | * | 5/1998 | Lawrence .................... 709/220 |
| 5,777,988 A | * | 7/1998 | Cisneros ..................... 370/238 |
| 5,778,183 A | * | 7/1998 | Filion et al. ............. 395/200.53 |
| 5,867,636 A | * | 2/1999 | Walker ........................ 395/114 |
| 5,905,906 A | * | 5/1999 | Goffinet et al. ............. 395/828 |
| 5,933,580 A | * | 8/1999 | Uda et al. .................... 395/112 |
| 5,935,218 A | * | 8/1999 | Beyda et al. ............. 340/825.5 |
| 5,949,799 A | * | 9/1999 | Grivna et al. ................. 371/33 |
| 5,968,197 A | * | 10/1999 | Doiron ........................ 714/748 |
| 6,031,624 A | * | 2/2000 | Murphy ...................... 358/1.17 |
| 6,046,817 A | * | 4/2000 | Brown et al. ............... 358/1.16 |
| 6,075,618 A | * | 6/2000 | Nakai ......................... 358/1.13 |
| 6,118,762 A | * | 9/2000 | Nomura et al. ............. 370/230 |
| 6,130,758 A | * | 10/2000 | Funazaki .................... 358/1.13 |
| 6,219,151 B1 | * | 4/2001 | Manglapus et al. ........ 358/1.15 |
| 6,289,003 B1 | * | 9/2001 | Raitola et al. .............. 370/278 |
| 6,298,405 B1 | * | 10/2001 | Ito et al. ...................... 710/107 |

FOREIGN PATENT DOCUMENTS

| | | | | |
|---|---|---|---|---|
| JP | 363292846 | * | 11/1988 | ........... H04L/11/20 |
| JP | 405007205 | * | 1/1993 | ........... H04L/12/40 |
| JP | 08036474 | * | 2/1996 | ............. G06F/3/12 |

* cited by examiner

*Primary Examiner*—Edward Coles
*Assistant Examiner*—Lia Carter
(74) *Attorney, Agent, or Firm*—Fitzpatrick, Cella, Harper & Scinto

(57) ABSTRACT

A printing system has a host apparatus (information processing apparatus) and a printing apparatus (output apparatus) for performing a printing operation in accordance with data supplied from the host apparatus. A plurality of communication channels are provided between the host apparatus and the printing apparatus. The numbers of packets transmittable and receivable in each communication channel are checked. When there is no packet transmittable to the printing apparatus from the host apparatus, the host apparatus issues a request, after a lapse of a predetermined delay time, to instruct the printing apparatus to inform the host apparatus of the number of valid packets. The delay time for issuing a subsequent request to the printing apparatus for the notification of the number of valid packets is adjusted in accordance with the previous delay time and the number of packets obtained in response to the previous request from the host apparatus.

16 Claims, 8 Drawing Sheets

PRINTING SYSTEM, CONTROL METHOD THEREFOR, AND RECORDING MEDIUM

BACKGROUND OF THE INVENTION

1. Field of the Invention

The present invention relates to a printing system, formed of an information processing apparatus and an output apparatus for performing a printing operation in accordance with data supplied from the information processing apparatus. The invention also relates to a control method for the above type of printing system and to a medium on which a program implementing such a method is recorded.

2. Description of the Related Art

Hitherto, a printing system which is formed of a host apparatus, such as a personal computer, and a printer, between which two-way data communications are performed based on, for example, IEEE1284.4, is known. Above all, a printing system that controls data communications by informing the number of packets that can be transmitted and received between a host apparatus and a printer is also known. In the above type of printing system, the following two-way communication control has been suggested. A plurality of channels are provided in two-way communications: one of the channels is used for outputting print data, and the other channel is used for monitoring the current status of the printer. The number of packets that can be transmitted and received in each packet is informed between the host apparatus and the printer.

In the above-described communication control, however, after one apparatus has notified the other apparatus of the number of packets transmittable to the other apparatus, it requests the other apparatus to report the number of packets transmittable by the other apparatus, and is unable to perform data communications until it receives the answer. In this manner, one apparatus is required to request the other apparatus to inform the number of valid packets many times until it receives the answer. It is also necessary for the other apparatus to respond to the request by temporarily interrupting its current operation, which delays the operation which was to originally be performed. If the apparatus is required to make the request many times before receiving an answer, traffic is disadvantageously increased due to such wasteful requests.

In the event of printer errors, such as a paper jam or exhaustion of ink, the printer is unable to resume printing unless the factor causing the error is removed. Additionally, once the printer receives the maximum number of packets that it can receive, it is no longer able to receive more packets. Thus, any request made by the host apparatus to obtain the number of packets transmittable by the printer while an error is occurring wastefully increases traffic.

SUMMARY OF THE INVENTION

Accordingly, in view of the aforementioned problems, it is an object of the present invention to provide a printing system by which convenience of use and operation efficiency are improved and by which wasteful overheads caused by repeated issuing of a request for the number of valid packets are prevented, and also to a control method for the printing system and to a medium on which a program implementing the above control method is recorded.

In order to achieve the above object, according to one aspect of the present invention, there is provided a printing system comprising an information processing apparatus, and an output apparatus for performing a printing operation in accordance with data supplied from the information processing apparatus. The printing system comprises control means for controlling communications between the information processing apparatus and the output apparatus by checking a number of transmittable and receivable packets in each of communication channels provided between the information processing apparatus and the output apparatus. Adjusting means issues a request, after a lapse of a predetermined delay time, to instruct the output apparatus to notify the information processing apparatus of a number of valid packets of the output apparatus when there is no packet transmittable to the output apparatus from the information processing apparatus, and adjusts the delay time for issuing a subsequent request to the output apparatus for the notification of the number of valid packets in accordance with the previous delay time and the number of packets obtained in response to the previous request.

In the aforementioned printing system, the adjusting means may respond to the request for the notification of the number of valid packets after a lapse of a predetermined delay time, and may adjust the delay time for responding to a subsequent request from the information processing apparatus for the notification of the number of valid packets in accordance with the number of packets notified in response to the previous request.

In the aforementioned printing system, the adjusting means may issue a request, after a lapse of a predetermined delay time, to instruct the information processing apparatus to notify the output apparatus of a number of valid packets of the information processing apparatus in a case where there is no packet transmittable to the information processing apparatus from the output apparatus, and may adjust the delay time for issuing a subsequent request to the information processing apparatus for the notification of the number of valid packets in accordance with the previous delay time and the number of packets obtained in response to the previous request.

In the aforementioned printing system, the adjusting means may respond to the request for the notification of the number of valid packets after a lapse of a predetermined delay time, and may adjust the delay time for responding to a subsequent request from the output apparatus for the notification of the number of valid packets in accordance with the number of packets notified in response to the previous request.

According to another aspect of the present invention, there is provided a control method for a printing system which comprises an information processing apparatus and an output apparatus for performing a printing operation in accordance with data supplied from the information processing apparatus. The control method comprising the steps of: checking a number of transmittable and receivable packets in each of a plurality of communication channels provided between the information processing apparatus and the output apparatus; issuing a request, after a lapse of a predetermined delay time, to instruct the output apparatus to notify the information processing apparatus of a number of valid packets of the output apparatus when there is no packet transmittable to the output apparatus from the information processing apparatus; and adjusting the delay time for issuing a subsequent request to the output apparatus for the notification of the number of valid packets in accordance with the previous delay time and the number of packets obtained in response to the previous request.

In the aforementioned control method, the adjusting step may respond to the request for the notification of the number of valid packets after a lapse of a predetermined delay time, and may adjust the delay time for responding to a subsequent request from the information processing apparatus for the notification of the number of valid packets in accordance with the number of packets notified in response to the previous request.

In the aforementioned control method, the adjusting step may issue a request, after a lapse of a predetermined delay time, to instruct the information processing apparatus to notify the output apparatus of a number of valid packets of the information processing apparatus when there is no packet transmittable to the information processing apparatus. from the output apparatus, and the adjusting step may adjust the delay time for issuing a subsequent request to the information processing apparatus for the notification of the number of valid packets in accordance with the previous delay time and the number of packets obtained in response to the previous request.

In the foregoing control method, the adjusting step may respond to the request for the notification of the number of valid packets after a lapse of a predetermined delay time, and may adjust the delay time for responding to a subsequent request from the output apparatus for the notification of the number of valid packets in accordance with the number of packets notified in response to the previous request.

According to a further aspect of the present invention, there is provided a medium on which a program is recorded. The program comprises the steps of: checking a number of transmittable and receivable packets in each of a plurality of communication channels provided between an information processing apparatus and an output apparatus for performing a printing operation in accordance with data supplied from the information processing apparatus; issuing a request, after a lapse of a predetermined delay time, to instruct the output apparatus to notify the information processing apparatus of a number of valid packets of the output apparatus when there is no packet transmittable to the output apparatus from the information processing apparatus; and adjusting the delay time for issuing a subsequent request to the output apparatus for the notification of the number of valid packets in accordance with the previous delay time and the number of packets obtained in response to the previous request.

In the aforementioned medium, the program may comprise a step of responding to the request for the notification of the number of valid packets after a lapse of a predetermined delay time, and adjusting the delay time for responding to a subsequent request from the information processing apparatus for the notification of the number of valid packets in accordance with the number of packets obtained in response to the previous request.

In the aforementioned medium, the program may comprise a step of issuing a request, after a lapse of a predetermined delay time, to instruct the information processing apparatus to notify the output apparatus of a number of valid packets of the information processing apparatus when there is no packet transmittable to the information processing apparatus from the output apparatus, and adjusting the delay time for issuing a subsequent request to the information processing apparatus for the notification of the number of valid packets in accordance with the previous delay time and the number of packets obtained in response to the previous request.

In the aforementioned medium, the program may comprise a step of responding to the request for the notification of the number of valid packets after a lapse of a predetermined delay time, and adjusting the delay time for responding to a subsequent request from the output apparatus for the notification of the number of valid packets in accordance with the number of packets notified in response to the previous request.

Further objects, features and advantages of the present invention will become apparent from the following description of the preferred embodiments with reference to the attached drawings.

DESCRIPTION OF THE PREFERRED EMBODIMENT

First Embodiment

Figure 1:
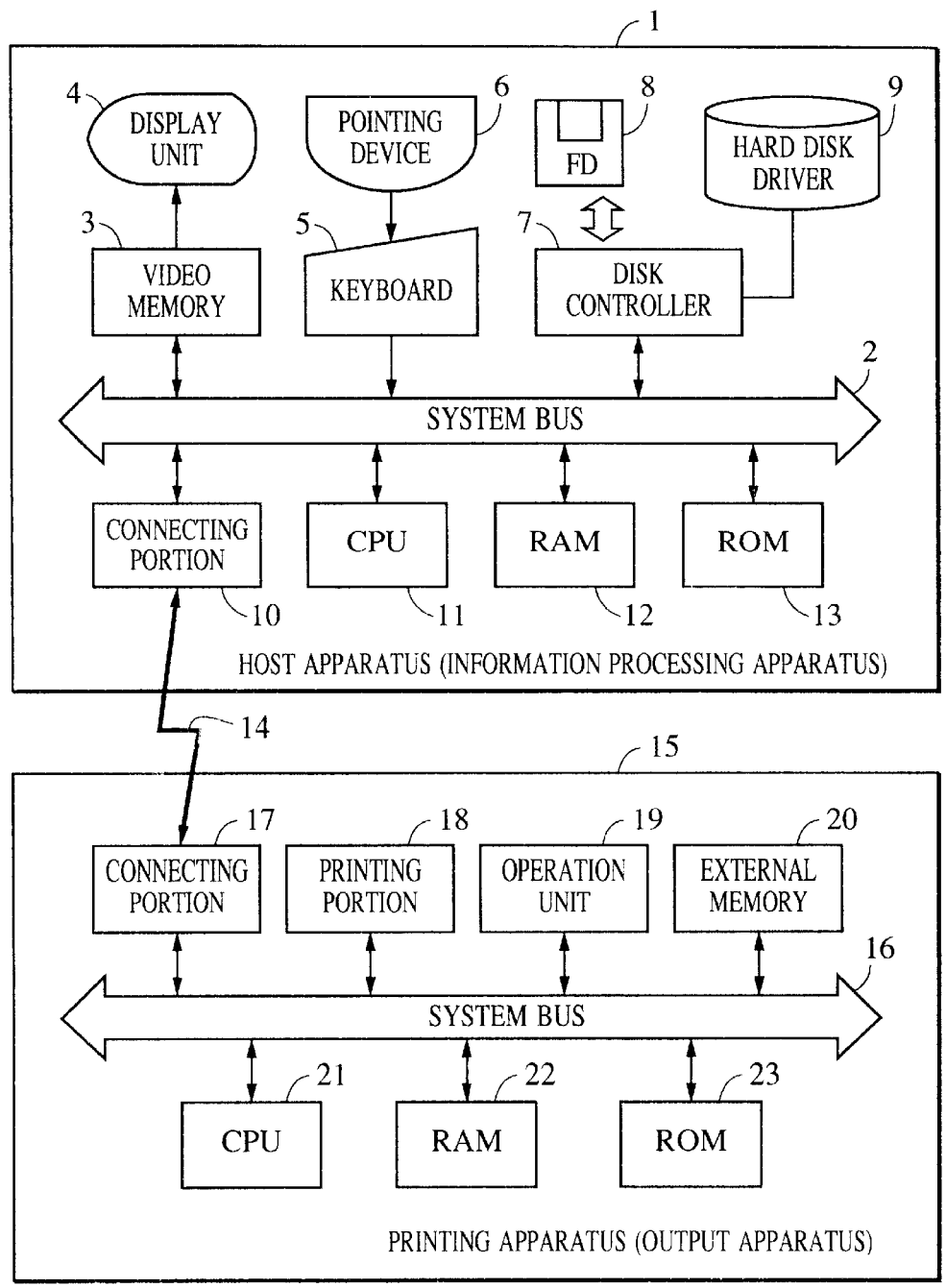
FIG. 1 is a block diagram illustrating the configuration of a printing system according to the present invention.

FIG. 1 is a block diagram illustrating the configuration of a printing system according to a first embodiment of the present invention.

In FIG. 1, host apparatus 1, which serves as an information processing apparatus, such as a personal computer, mainly includes video memory (VRAM) 3, display unit (CRT) 4, keyboard (KBD) 5, pointing device (PD) 6, disk controller 7, hard disk drive (HD) 9, connecting portion 10, central processing unit (CPU) 11, random access memory (RAM) 12, and read only memory (ROM) 13, all of which are connected to each other via system bus 2.

Predetermined two-way interface 14 connects host apparatus 1 and printing apparatus (output apparatus) 15 for performing a printing operation according to data supplied from host apparatus 1. Interface 14 is interposed between connecting portions 10 and 17 of respective host apparatus 1 and printing apparatus 15. Printing apparatus 15 is mainly formed of connecting portion 17, printing portion (print engine) 18, operation unit 19, external memory 20, CPU 21, RAM 22, and ROM 23, all of which are connected to each other via system bus 16.

CPU 11 within host apparatus 1 controls entire apparatus 1 according to a program as indicated by the flow chart of FIG. 2, which will be discussed later. RAM 12, which serves as a main memory, stores the program executed by CPU 11 and also has a storage area, used as a work data area, for temporarily storing various data when CPU 11 performs control. Disk controller 7 controls access to/from an external storage device, which serves as an external memory, such as HD 9 or floppy disk (FD) 8.

HD 9 or FD 8, which reads/writes data from/into a magnetic storage medium on a disk, stores not only various graphics data and document data, but also a boot program downloaded into ROM 13 and executed by host apparatus 1, an operating system (OS), which serves as a control program executed by CPU 11, various application programs, a printer control command (print data) generating program (printer driver), and a printing system program having a page control function. The above-mentioned storage medium is not restricted to HD 9 or FD 8, but may be a magnetic tape, a compact disc-read only memory (CD-ROM), an integrated circuit (IC) memory card, or a digital versatile disc (DVD).

ROM 13, which is an internal memory, stores various data and programs, as well as above-described HD 9 or FD 8. Display unit 4, which is formed of a cathode ray tube (CRT) or a liquid crystal, displays various graphics, such as bit map data, command images of a command menu, and operator's messages on a display. Video memory 3 stores data to be displayed on display unit 4.

KBD 5 or PD 6 is operated by the operator to input various data and commands or the printing mode. By using KBD 5 or PD 6, the command image of the command menu indicated on the screen of display unit 4 can be selected to specify the execution of the command or the printing mode. Connecting portion 10 of host apparatus 1 is connected to connecting portion 17 of printing apparatus 15 via predetermined two-way interface 14, such as a Centronics interface, a network interface, or an infrared interface. Accordingly, connecting portion 10 controls communications with printing apparatus 15, such as transmitting a printer control command (or print data), which will be described in detail later.

CPU 21 within printing apparatus 15, which controls entire apparatus 15, transmits, based on the control program stored in ROM 23 or external memory 20, to print engine 18 an image signal obtained by the printer control command (or print data) received through connecting portion 17.

RAM 22, which serves as a main memory for CPU 21, has a storage area, used as a work data area, for temporarily storing various data when CPU 21 performs control. External memory 20 is optionally connected and stores font data, emulation programs, form data, etc. ROM 23 is a printer internal memory. ROM 23, as well as external memory 20, stores various data, a printer control program for controlling printing apparatus 15, and so on.

Printing portion (print engine) 18 receives an image signal output via system bus 16 in accordance with the control program stored in ROM 23 or external memory 20 and performs a printing operation under the control of CPU 21. Operation unit 19, which is formed of an input portion, such as an operation panel and operation switches, and a display, such as an LED or a liquid crystal panel, receives an instruction by the user's operation and displays the result. The user is able to specify and check the setting of printing apparatus 15 via operation unit 19.

Connecting portion 17, which is connected to connecting portion 10 of host apparatus 1 via aforementioned two-way interface 14, receives a printer control command (or print data) and notifies host apparatus 1 of the internal state of printing apparatus 15.

The operation of this embodiment is described below with reference to the flow charts of FIGS. 2 and 3. FIG. 2 is a flow chart illustrating the basic operation of the printing system shown in FIG. 1. FIG. 3 is a flow chart illustrating the operation of requesting the notification of the number of valid packets (hereinafter referred to as "credits") transmittable and receivable between host apparatus 1 and printing apparatus 15. The control operation indicated by the flow chart of FIG. 3 is executed by CPUs 11 and 21 in accordance with the programs stored in ROMs 13 and 23, respectively.

In this embodiment, it is assumed that the data is transmitted from host apparatus 1 to printing apparatus 15, and in the interest of simplicity, the time required for transmitting data in a transmission passage is considered to be zero. A data channel for transmitting and receiving print data, a control channel, and a status channel are reserved between host apparatus 1 and printing apparatus 15. A credit request and a credit response can be issued through the control channel, while the statuses of host apparatus 1 and printing apparatus 15 can be reported between each other through the status channel, for example, it is possible to inform whether apparatuses 1 and 15 are operating in a normal condition, their power is in the off state, or printing apparatus 15 is out of paper.

RAM 12 of host apparatus 1 shown in FIG. 1 retains a delay time $t_0$, which is suitably set as an initial value, before host apparatus 1 makes a credit request to printing apparatus 15 after the credit of host apparatus 1 has become zero. RAM 12 also retains Max_credit, which is suitably set as an initial value and represents the maximum value of the credit expected to be returned from printing apparatus 15 to host apparatus 1. Max_credit is smaller than the maximum number of packets transmittable and receivable in the data channel between host apparatus 1 and printing apparatus 15.

Figure 2:
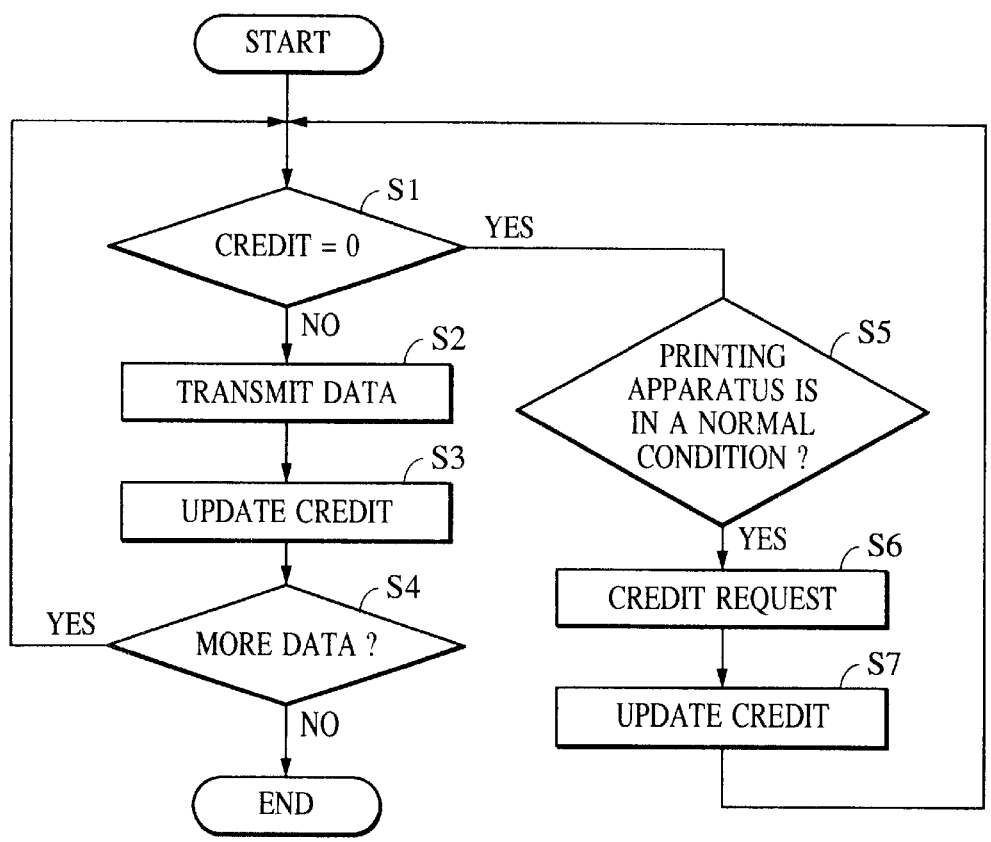
FIG. 2 is a flow chart illustrating the basic operation performed by the printing system shown in FIG. 1.
Figure 3:
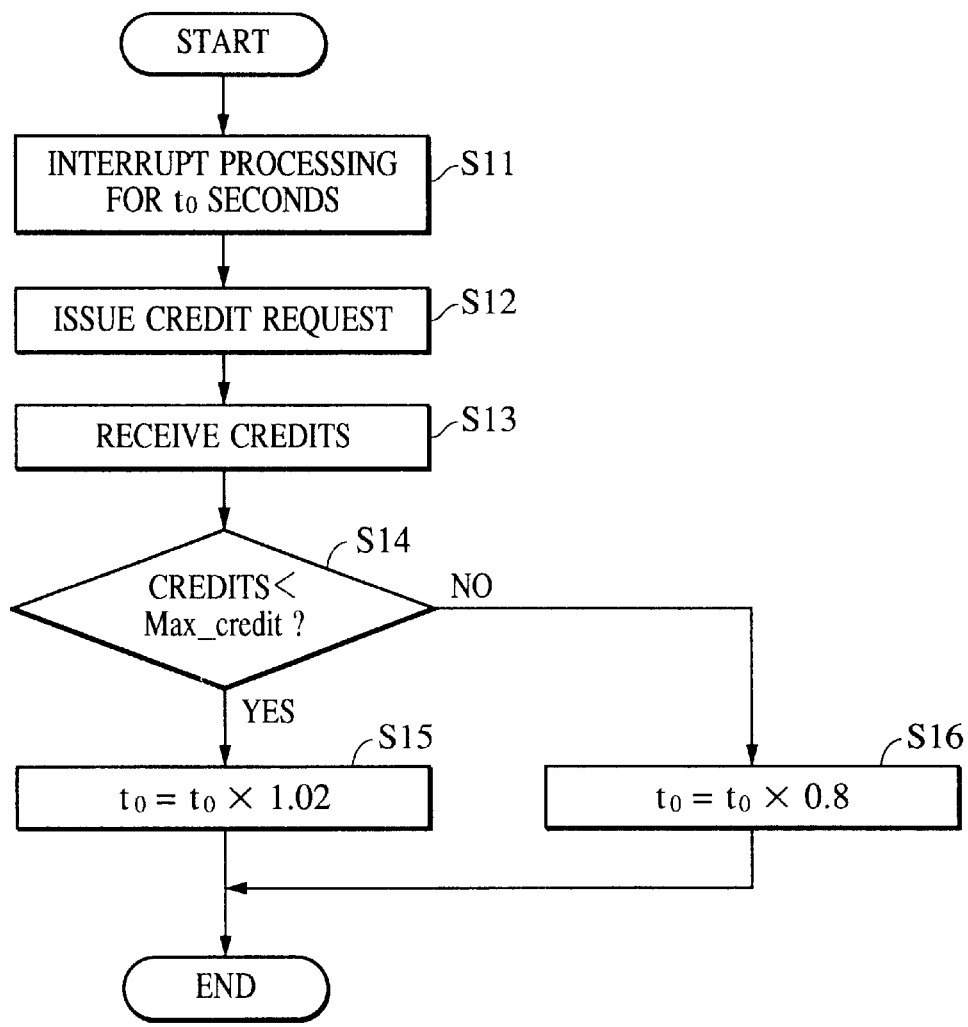
FIG. 3 is a flow chart illustrating the control processing according to a first embodiment of the present invention.
Figure 6:
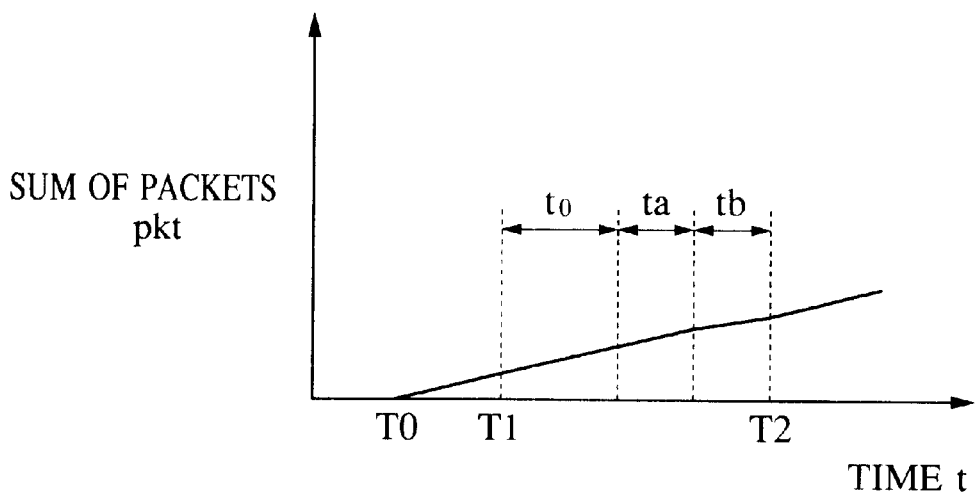
FIG. 6 illustrates the relationship between the time and the sum of the processed packets in the first embodiment.

Referring to FIG. 2, in step S1, host apparatus 1 checks whether the credit stored in RAM 12 is equal to zero. If the outcome of step S1 is no, i.e., if the credit value is valid, the process proceeds to step S2 in which host apparatus 1 transmits data to printing apparatus 15. Printing apparatus 15 receives the data and adds it to the end of the data stored in RAM 22. Printing apparatus 15 then starts printing sequentially from the head of the data stored in RAM 22. In this case, by being initialized, printing apparatus 15 does not start printing immediately after receiving the data, but commences, as shown in FIG. 6, when T0 seconds elapse after host apparatus 1 has transmitted the data. The area of RAM 22 that has stored the data is released after transmitting the data.

Then, in step S3, the amount of data transmitted in step S2 is subtracted from the number of transmittable packets stored in RAM 12. For example, if host apparatus 1 transmits one packet to printing apparatus 15, the number of credits stored in RAM 12 is decreased by one. Similarly, if printing apparatus 15 receives one packet from host apparatus 1, the number of credits (transmittable packets) stored in RAM 22 is decreased by one. The process then proceeds to step S4 in which a determination is made of whether there is more data to be transmitted. If the result of step S4 is yes, the process returns to step S1 in which the required processing is executed. If the outcome of step S4 is no, the process is completed.

If it is found in step S1 that the credit is zero, the flow proceeds to step S5 in which it is checked by using the status channel according to a predetermined method whether printing apparatus 15 is in a normal condition. If the result of step S5 is yes, host apparatus 1 issues a credit request to printing apparatus 15 in step S6. If, however, it is found in step S5 that printing apparatus 15 is not in a normal condition, host apparatus 1 does not issue a credit request because the number of credits receivable by printing apparatus 15 cannot be expected to be increased. In step S7, the number of credits returned from printing apparatus 15 in response to the credit request issued in step S6 is stored in RAM 12 as a new number of credits. Thereafter, the flow returns to step S1 in which the processing is repeated, and the data transmission is started in step S2 after a lapse of T2 seconds.

By repeating the above-described steps S1 through S4, the number of packets transmittable by host apparatus 1 becomes zero, and the number of packets receivable by printing apparatus 15 becomes zero, i.e., the number of credits becomes zero. Simultaneously, at time T1 of FIG. 5, host apparatus 1 discontinues transmitting the data to printing apparatus 15.

Figure 5:
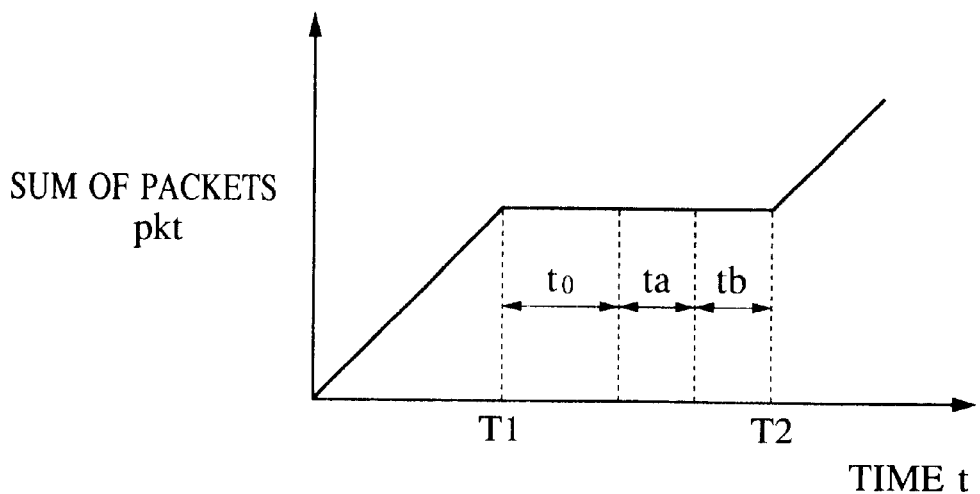
FIG. 5 illustrates the relationship between the time and the sum of the transmitted packets in the first embodiment.

FIG. 5 illustrates an example of the relationship between the time and the sum of the packets transmitted to printing apparatus 15 from host apparatus 1.

The credit of host apparatus 1 becomes zero when T1 seconds elapse after starting to transmit data. Host apparatus 1 then issues a credit request after $t_0$ seconds. It takes ta seconds for host apparatus 1 to execute processing of issuing the credit request and tb seconds for printing apparatus 15 to execute processing of responding to the request. Accordingly, host apparatus 1 receives credits from printing apparatus 15 and is able to restart transmitting print data when T2 seconds elapse after starting to transmit the data.

FIG. 6 illustrates an example of the relationship between the time and the sum of the packets processed by printing apparatus 15 according to the first embodiment.

Printing apparatus 15 starts printing when T0 seconds elapse after receiving the first data. The credit of host apparatus 1 becomes zero when T1 seconds elapse, and thus issues a credit request after $t_0$ seconds. It takes ta seconds for host apparatus 1 to execute processing of issuing a credit request. Upon receiving the credit request, printing apparatus 15 immediately responds to host apparatus 1, and it takes tb seconds for printing apparatus 15 to execute processing of responding to the request. Since printing apparatus 15 is executing both printing operation and processing of responding to the request, the printing speed decreases. Host apparatus 1 receives credits from printing apparatus 15 and is able to restart transmitting print data when T2 seconds elapse after transmitting the first data.

The processing of issuing a credit request in step S6 is described below in detail with reference to the flow chart of FIG. 3.

In step S11, CPU 11 reads the delay time $t_0$, which starts after the number of transmittable packets stored in RAM 12 has become zero and lasts before host apparatus 1 makes a credit request to printing apparatus 15, and the processing is interrupted until the obtained delay time $t_0$ elapses. After the delay time $t_0$ has elapsed, the process proceeds to step S12 in which host apparatus 1 issues a credit request to printing apparatus 15 according to a predetermined method. In this case, it takes ta seconds for host apparatus 1 to execute processing of issuing a credit request, as illustrated in FIGS. 5 and 6.

In step S13, host apparatus 1 then receives a response from printing apparatus 15 and stores credits received from printing apparatus 15 in RAM 12. In this case, it takes tb seconds, as illustrated in FIGS. 5 and 6, for printing apparatus 15 to execute processing of responding to the credit request. Since printing apparatus 15 is simultaneously executing both printing operation and processing of responding to the request, the printing speed decreases. After T2 seconds, however, host apparatus 1 restarts transmitting data, and the printing speed of printing apparatus 15 is recovered.

A determination is then made in step S14 of whether the number of credits obtained in step S13 is smaller than Max_credit. If the outcome of step S14 is yes, the flow proceeds to step S15 in which CPU 11 increases the delay time $t_0$ stored in RAM 12 by multiplying it by 1.02, and the increased value is newly stored in RAM 12. If it is found in step S14 that the number of credits is not smaller than Max_credit, the process proceeds to step S16 in which CPU 11 decreases the delay time $t_0$ stored in RAM 12 by multiplying it by 0.8, and the decreased value is newly stored in RAM 12.

Figure 9:
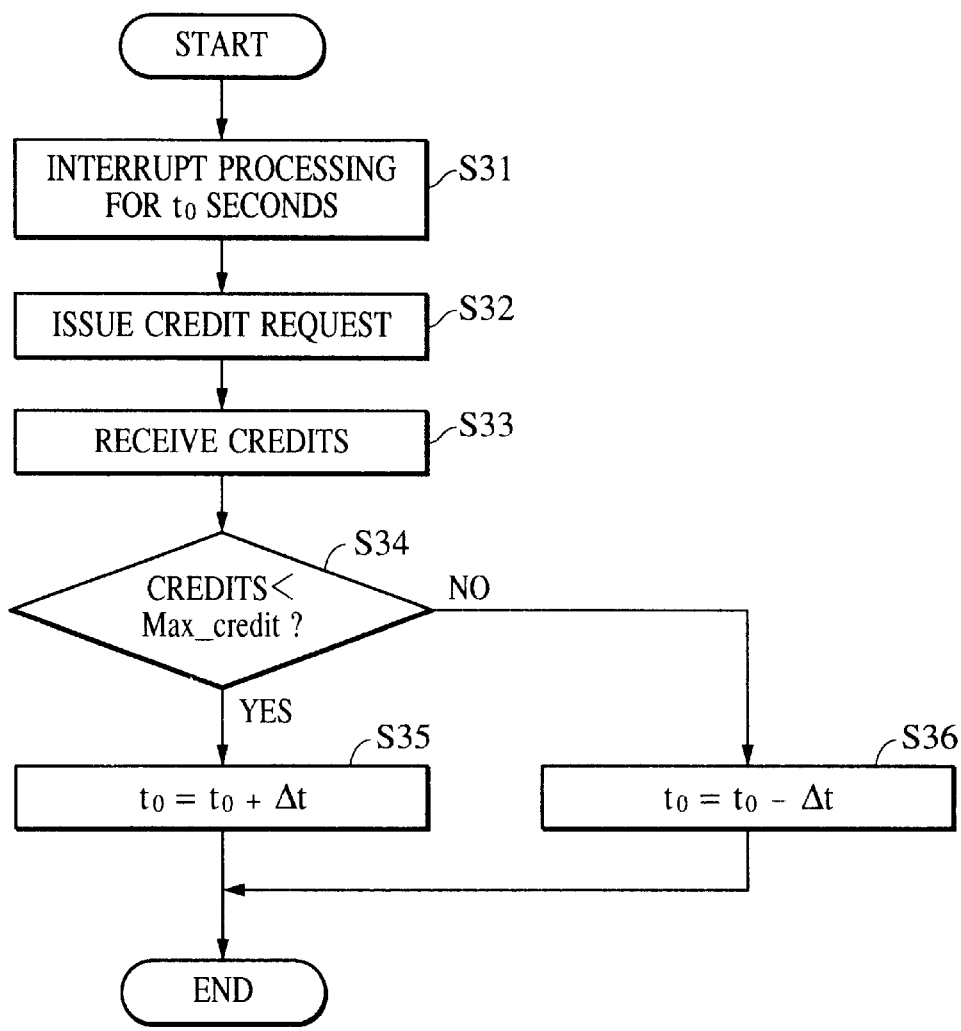
FIG. 9 is a flow chart illustrating a modification of the control processing shown in FIG. 3.

Alternatively, in order to lessen the load of CPU 11 of host apparatus (information processing apparatus) 1, the processing indicated by the flow chart of FIG. 9 may be employed instead of the processing indicated by the flow chart of FIG. 3. The flow chart of FIG. 9 is similar to that of FIG. 3, except for steps S35 and S36, i.e., steps S31 through S34 of FIG. 9 are similar to steps S11 through S14 of FIG. 3. In step S34 (S14), a determination is made of whether the number of credits obtained in step S33 (S13) is smaller than Max_credit. If the result of step S34 is yes, the process proceeds to step S35 in which CPU 11 adds an increase or a decrease $\Delta t_0$ of the delay time $t_0$ stored in RAM 12 to the delay time $t_0$, and the resulting value is newly stored in RAM 12. If it is found in step S34 (S14) that the number of credits is not smaller than Max_credit, the flow proceeds to step S36 in which CPU 11 subtracts an increase or a decrease $\Delta t_0$ of the delay time to stored in RAM 12 from the delay time $t_0$, and the resulting value is newly stored in RAM 12.

As discussed above, when the number of packets, i.e., the number of credits, stored in host apparatus 1 and transmittable to printing apparatus 15 becomes zero, the delay time, which lasts before host apparatus 1 makes a credit request, can be automatically adjusted to a suitable value. The number of credits returned from printing apparatus 15 in response to the credit request can approximate the maximum credit so as to reduce the number of credit requests and credit responses, thereby inhibiting an increase in traffic. Owing to a decrease in the number of credit responses, the printing speed of printing apparatus 15 can be substantially maintained. Additionally, a value smaller than the actual maximum credit is set in Max_credit, thereby preventing prolonged processing of issuing a credit request.

Second Embodiment

A description is given below of a second embodiment of the present invention. The configuration and the basic operation of a printing system in accordance with the second embodiment are similar to those shown in FIGS. 1 and 2, and thus, FIGS. 1 and 2 are used for describing the second embodiment.

RAM 22 of printing apparatus 15 shown in FIG. 1 retains a delay time $t_1$, which is suitably set as an initial value, before printing apparatus 15 sends a credit response to host apparatus 1 after receiving a credit request from host apparatus 1. RAM 22 also retains Max_credit, which is suitably set as an initial value and represents the maximum value of the credit expected to be returned from printing apparatus 15 to host apparatus 1. Max_credit is smaller than the maximum number of packets transmittable and receivable in the data channel between host apparatus 1 and printing apparatus 15.

Figure 8:
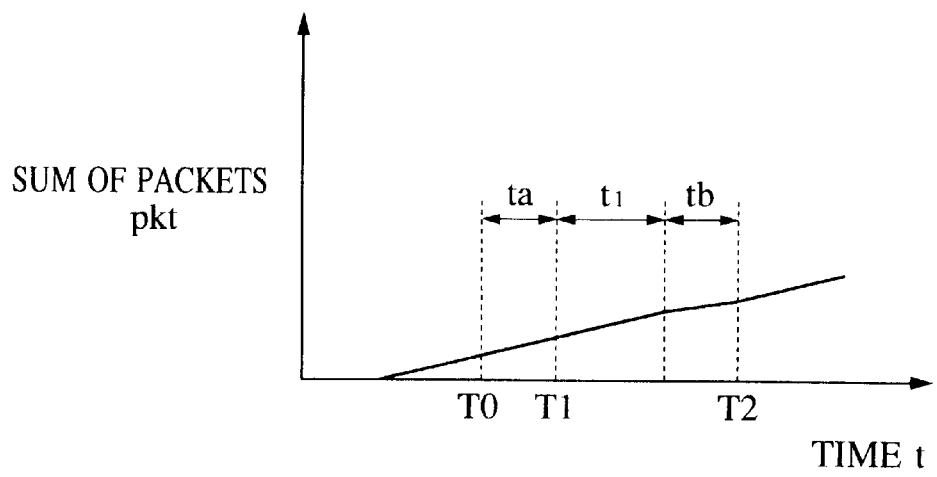
FIG. 8 illustrates the relationship between the time and the sum of the processed packets in the second embodiment.

Referring to FIG. 2, in step S1, host apparatus 1 checks whether the credit stored in RAM 12 is equal to zero. If the outcome of step S1 is no, i.e., if the credit value is valid, the process proceeds to step S2 in which host apparatus 1 transmits data to printing apparatus 15. Printing apparatus 15 receives the data and adds it to the end of the data stored in RAM 22. Printing apparatus 15 then starts printing sequentially from the head of the data stored in RAM 22. In this case, by being initialized, printing apparatus 15 does not start printing immediately after receiving the data, but commences, as shown in FIG. 8, when T0 seconds elapse after host apparatus 1 has started transmitting the data. The area of RAM 22 that has stored the data is released after transmitting the data.

Then, in step S3, the amount of data transmitted in step S2 is subtracted from the number of transmittable packets stored in RAM 12. For example, if host apparatus 1 transmits one packet to printing apparatus 15, the number of credits stored in RAM 12 is decreased by one. Similarly, if printing apparatus 15 receives one packet from host apparatus 1, the number of credits (transmittable packets) stored in RAM 22 is decreased by one. The process then proceeds to step S4 in which a determination is made of whether there is more data to be transmitted. If the result of step S4 is yes, the process returns to step S1 in which the required processing is executed. If the outcome of step S4 is no, the process is completed.

If it is found in step S1 that the credit is zero, the flow proceeds to step S5 in which it is checked by using the status channel according to a predetermined method whether printing apparatus 15 is in a normal condition. If the result of step S5 is yes, host apparatus 1 issues a credit request to printing apparatus 15 in step S6. If, however, it is found in step S5 that printing apparatus 15 is not in a normal condition, host apparatus 1 does not issue a credit request because the number of credits receivable by printing apparatus 15 cannot be expected to be increased. In step S7, the number of credits returned from printing apparatus 15 in response to the credit request issued in step S6 is stored in RAM 12 as a new number of credits. Thereafter, the flow returns to step S1 in which the processing is repeated.

By repeating the above-described steps S1 through S4, the number of packets transmittable by host apparatus 1 becomes zero, and the number of packets receivable by printing apparatus 15 becomes zero, i.e., the number of credits becomes zero. Simultaneously, at time T1 of FIG. 7, host apparatus 1 discontinues transmitting the data to printing apparatus 15.

Figure 7:
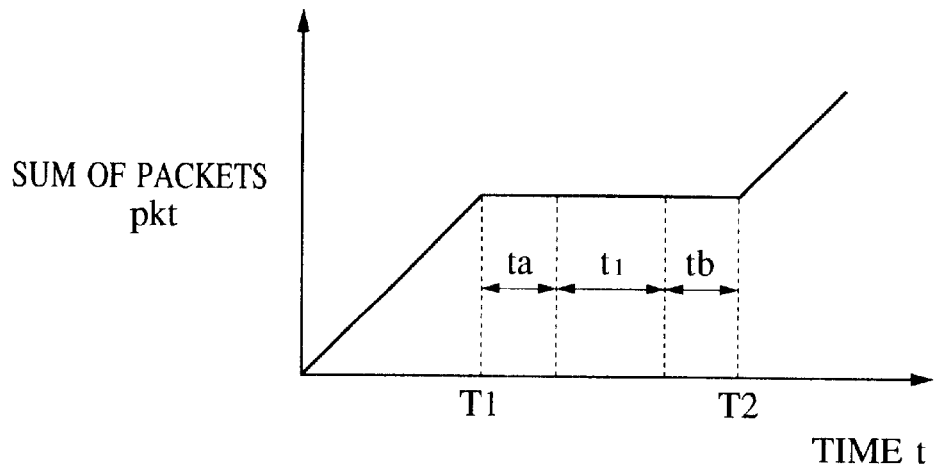
FIG. 7 illustrates the relationship between the time and the sum of the transmitted packets in the second embodiment.

FIG. 7 illustrates an example of the relationship between the time and the sum of the packets transmitted from host apparatus 1 to printing apparatus 15 according to the second embodiment.

The credit of host apparatus 1 becomes zero when T1 seconds elapse after host apparatus 1 has started to transmit data, and host apparatus 1 issues a credit request to printing apparatus 15. It takes ta seconds for host apparatus 1 to execute processing for issuing a credit request. Printing apparatus 15 responds to the credit request when $t_1$ seconds elapse upon completing processing of issuing a credit request. It takes tb seconds for printing apparatus 15 to perform processing of responding to the credit request. Subsequently, host apparatus 1 receives credits from printing apparatus 15 and restarts transmitting print data when T2 seconds elapse after starting to transmit the first data.

FIG. 8 illustrates an example of the relationship between the time and the sum of the packets processed by printing apparatus 15 according to the second embodiment.

Printing apparatus 15 starts printing when T0 seconds elapse after host apparatus 1 has commenced transmitting the first data. The credit of host apparatus 1 becomes zero after T1 seconds, and host apparatus immediately issues a credit request to printing apparatus 15. It takes ta seconds for host apparatus 1 to execute processing of issuing a credit request. Printing apparatus 15 returns a credit response when $t_1$ seconds elapse after receiving the credit request. It takes tb seconds for printing apparatus 15 to perform processing of responding to the credit request. Since, printing apparatus 15 is simultaneously performing printing operation and processing of responding to the credit request, the printing speed decreases. Thereafter, host apparatus 1 receives the credits from printing apparatus 15 and restarts transmitting print data when T2 seconds elapse after host apparatus 1 has begun to transmit the first data.

The processing of issuing a credit request in step S6 of FIG. 2 is described below in detail with reference to the flow chart of FIG. 4.

In step S21, host apparatus 1 issues a credit request to printing apparatus 15 according to a predetermined method. It takes ta seconds, as shown in FIGS. 7 and 8, for host apparatus 1 to execute processing of issuing a credit request. In step S22, CPU 21 reads the delay time $t_1$, which starts after receiving a credit request from host apparatus 1 and lasts before printing apparatus 15 sends a credit response to host apparatus 1. The processing is interrupted until the obtained delay time $t_1$ elapses. After the lapse of the delay time $t_1$, the process proceeds to step S23.

In step S23, printing apparatus 15 returns the number of receivable packets to host apparatus 1 as credits. The credits obtained from printing apparatus 15 are then stored in RAM 12 of host apparatus 1. It takes, as shown in FIGS. 7 and 8, tb seconds for printing apparatus 15 to perform processing of responding to the credit request. Since printing apparatus 15 is simultaneously performing printing operation and processing of responding to the credit request, the printing speed decreases. At T2 seconds, however, host apparatus 1 restarts data transmission, and the printing speed of printing apparatus 15 is recovered.

Subsequently, it is determined in step S24 whether the number of credits obtained in step S23 is smaller than Max_credit. If the outcome of step S24 is yes, the process proceeds to step S25 in which CPU 21 increases the delay time $t_1$ stored in RAM 22 by multiplying it by 1.02, and the increased value is newly stored in RAM 22. If it is found in step S24 that the number of credits is not smaller than Max_credit, the process proceeds to step S26 in which CPU 21 decreases the delay time $t_1$ by multiplying it by 0.8, and the decreased value is newly stored in RAM 22.

Figure 4:
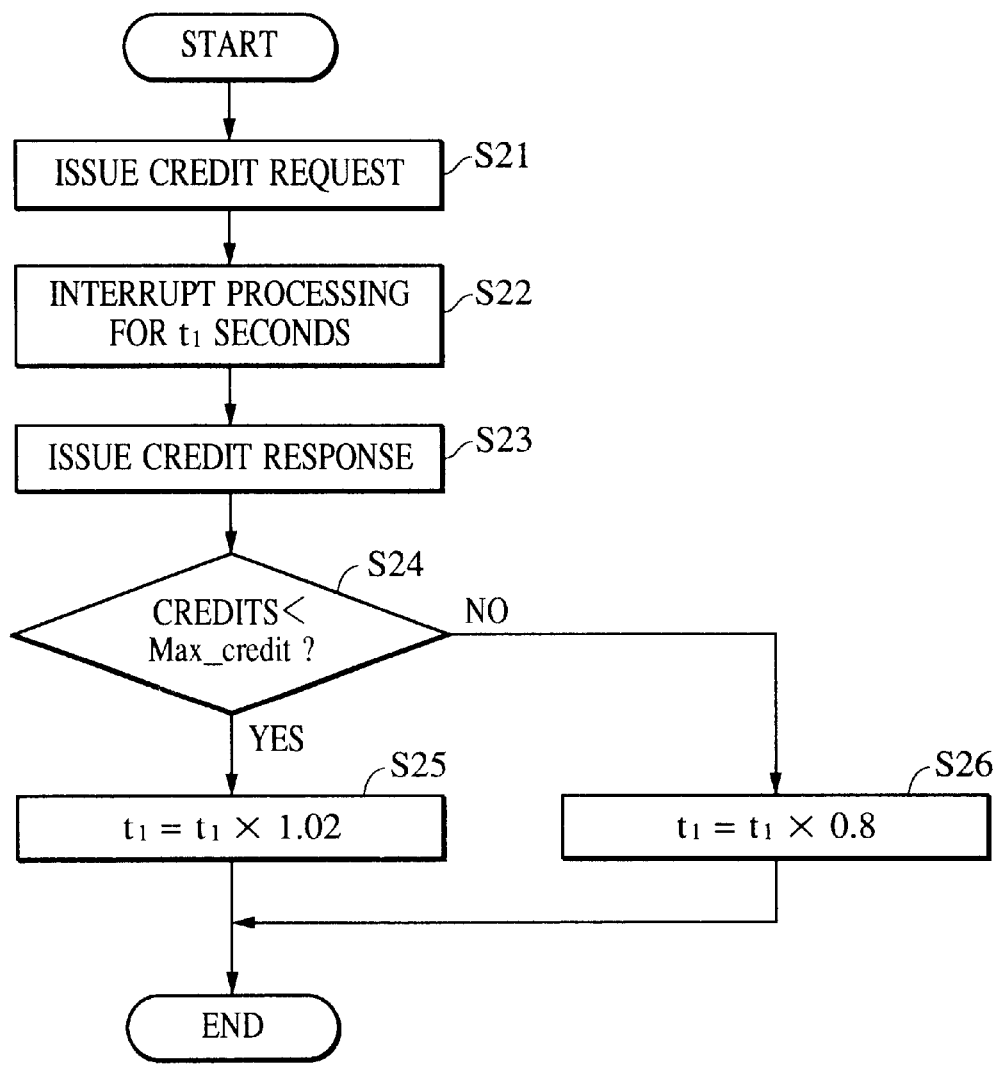
FIG. 4 is a flow chart illustrating the control processing according to a second embodiment of the present invention.
Figure 10:
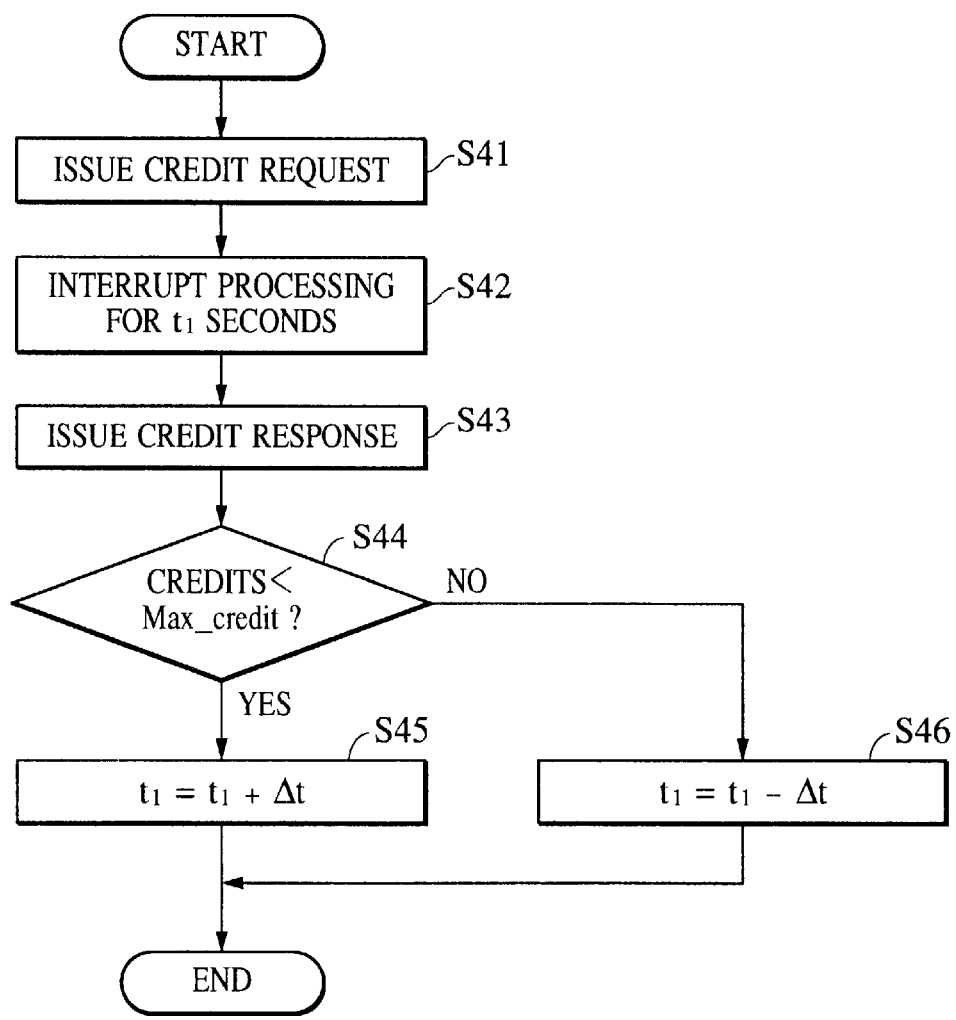
FIG. 10 is a flow chart illustrating a modification of the control processing shown in FIG. 4.

Alternatively, in order to reduce the load of CPU 21 of printing apparatus (output apparatus) 15, the processing indicated by the flow chart of FIG. 10 may be employed instead of the processing indicated by the flow chart of FIG. 4. The flow chart of FIG. 10 is similar to that of FIG. 4, except for steps S45 and S46, i.e., steps S41 through S44 of FIG. 10 are similar to steps S21 through S24 of FIG. 4. In step S44 (S24), a determination is made of whether the number of credits obtained in step S43 (S23) is smaller than Max_credit. If the result of step S44 is yes, the process proceeds to step S45 in which CPU 21 adds an increase or a decrease $\Delta t_1$ of the delay time $t_1$ stored in RAM 22 to the delay time $t_1$, and the resulting value is newly stored in RAM 22. If it is found in step S44 (S24) that the number of credits is not smaller than Max_credit, the flow proceeds to step S46 in which CPU 21 subtracts an increase or a decrease $\Delta t_1$ of the delay time $t_1$ stored in RAM 22 from the delay time $t_1$, and the resulting value is newly stored in RAM 22.

As described above, when the number of packets, i.e., the number of credits, stored in host apparatus 1 and transmittable to printing apparatus 15 becomes zero, the delay time $t_0$, which lasts before host apparatus 1 makes a credit request, and the delay time $t_1$, which lasts before printing apparatus 15 returns a credit response, can be automatically adjusted to a suitable value. The number of credits returned from printing apparatus 15 in response to the credit request can approximate the maximum credit so as to reduce the number of credit requests and credit responses, thereby suppressing an increase in traffic. Owing to a decrease in the number of credit responses, the printing speed of printing apparatus 15 can be substantially maintained.

Although in the foregoing embodiments the direction of data transmission is from host apparatus 1 to printing apparatus 15, it may be from printing apparatus 15 to host apparatus 1.

The present invention may be applied to a system formed of a plurality of apparatuses or to a single apparatus. The invention may also be accomplished by supplying a program implementing the above control method to the system or the apparatus. In this case, a recording medium (for example, a FD, a ROM, or a CD-ROM) on which such a program is recorded constitutes the present invention. The program is read into the system or the apparatus from the recording medium, thereby operating the system or the apparatus according to a predetermined method.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing system comprising an information processing apparatus, and an output apparatus for performing a printing operation in accordance with data supplied from said information processing apparatus, said printing system comprising:

control means for controlling communications between said information processing apparatus and said output apparatus by checking a number of transmittable packets in each of communication channels provided between said information processing apparatus and said output apparatus; and adjusting means for issuing a request, after a lapse of a predetermined delay time, to instruct said output apparatus to notify said information processing apparatus of a number of transmittable packets in a case where there is no packet transmittable to said output apparatus from said information processing apparatus, and for adjusting the delay time for issuing a subsequent request to said output apparatus for the notification of the number of transmittable packets in accordance with the previous delay time and the number of transmittable packets obtained in response to the previous request.

2. A printing system comprising an information processing apparatus and an output apparatus for performing a printing operation in accordance with data supplied from said information processing apparatus, said printing system comprising:

control means for controlling communication between said information processing apparatus and said output apparatus by checking a number of transmittable packets in each of communication channels provided between said information processing apparatus and said output apparatus;

issuing means for issuing a request to instruct said output apparatus to notify said information processing apparatus of a number of transmittable packets in a case where there is no packet transmittable to said output apparatus from said information processing apparatus;

responding means for responding to the request for notification of the number of transmittable packets after a lapse of a predetermined delay time; and adjusting means for adjusting the delay time for responding to a subsequent request from said information processing apparatus for the notification of the number of transmittable packets in accordance with the previous delay time or the number of transmittable packets notified in response to the previous request.

3. A printing system comprising an information processing apparatus and an output apparatus for performing a printing operation, said printing system comprising:

control means for controlling communication between said information processing apparatus and said output apparatus by checking a number of transmittable packets in each of communication channels provided between said information processing apparatus and said output apparatus; and adjusting means for issuing a request, after a lapse of a predetermined delay time, to instruct said information processing apparatus to notify said output apparatus of a number of transmittable packets in a case where there is no packet transmittable to said information processing apparatus from said output apparatus, and for adjusting the delay time for issuing a subsequent request to said information processing apparatus for the notification of the number of transmittable packets in accordance with the previous delay time and the number of transmittable packets obtained in response to the previous request.

4. A printing system comprising an information processing apparatus and an output apparatus for performing a printing operation, said printing system comprising:

control means for controlling communication between said information processing apparatus and said output apparatus by checking a number of transmittable packets in each of communication channels provided between said information processing apparatus and said output apparatus;

issuing means for issuing a request to instruct said information processing apparatus to notify said output apparatus of a number of transmittable packets in a case where there is no packet transmittable to said information processing apparatus from said output apparatus;

responding means for responding to the request for notification of the number of transmittable packets after a lapse of a predetermined delay time; and adjusting means for adjusting the delay time for responding to a subsequent request from said output apparatus for the notification of the number of transmittable packets in accordance with the previous delay time or the number of transmittable packets notified in response to the previous request.

5. A control method for a printing system which comprises an information processing apparatus and an output apparatus for performing a printing operation in accordance with data supplied from said information processing apparatus, said control method comprising the steps of:

controlling communications between said information processing apparatus and said output apparatus by checking a number of transmittable packets in each of a plurality of communication channels provided between said information processing apparatus and said output apparatus;

issuing a request, after a lapse of a predetermined delay time, to instruct said output apparatus to notify said information processing apparatus of a number of transmittable packets in a case where there is no packet transmittable to said output apparatus from said information processing apparatus; and adjusting the delay time for issuing a subsequent request to said output apparatus for the notification of the number of transmittable packets in accordance with the previous delay time and the number of transmittable packets obtained in response to the previous request.

6. A control method for a printing system which comprises an information processing apparatus and an output apparatus for performing a printing operation in accordance with data supplied from said information processing apparatus, said control method comprising the steps of:

controlling communications between said information processing apparatus and said output apparatus by checking a number of transmittable packets in each of a plurality of communication channels provided between said information processing apparatus and said output apparatus;

issuing a request to instruct said output apparatus to notify said information processing apparatus of a number of transmittable packets in a case where there is no packet transmittable to said output apparatus from said information processing apparatus;

responding to the request for notification of the number of transmittable packets after a lapse of a predetermined delay time; and adjusting the delay time for responding to a subsequent request from said information processing apparatus for the notification of the number of transmittable packets in accordance with the previous delay time or the number of transmittable packets notified in response to the previous request.

7. A control method for a printing system which comprises an information processing apparatus and an output apparatus for performing a printing operation, said control method comprising the steps of:

controlling communications between said information processing apparatus and said output apparatus by checking a number of transmittable packets in each of a plurality of communication channels provided between said information processing apparatus and said output apparatus;

issuing a request, after a lapse of a predetermined delay time, to instruct said information processing apparatus to notify said output apparatus of a number of transmittable packets in a case where there is no packet transmittable to said information processing apparatus from said output apparatus; and adjusting the delay time for issuing a subsequent request to said information processing apparatus for the notification of the number of transmittable packets in accordance with the previous delay time or the number of transmittable packets obtained in response to the previous request.

8. A control method for a printing system which comprises an information processing apparatus and an output apparatus for performing a printing operation, said control method comprising the steps of:

controlling communications between said information processing apparatus and said output apparatus by checking a number of transmittable packets in each of a plurality of communication channels provided between said information processing apparatus and said output apparatus;

issuing a request to instruct said information processing apparatus to notify said output apparatus of a number of transmittable packets in a case where there is no packet transmittable to said information processing apparatus from said output apparatus;

responding to the request for notification of the number of transmittable packets after a lapse of a predetermined delay time; and adjusting the delay time for responding to a subsequent request from said output apparatus for the notification of the number of transmittable packets in accordance with the previous delay time or the number of transmittable packets notified in response to the previous request.

9. A computer readable medium on which a program is recorded, the program for a printing system which comprises an information processing apparatus and an output apparatus for performing a printing operation in accordance with data supplied from said information processing apparatus, said program comprising the steps of:

controlling communications between said information processing apparatus and said output apparatus by checking a number of transmittable packets in each of a plurality of communication channels provided between the information processing apparatus and the output apparatus;

issuing a request, after a lapse of a predetermined delay time, to instruct said output apparatus to notify said information processing apparatus of a number of transmittable packets in a case where there is no packet transmittable to said output apparatus from said information processing apparatus; and adjusting the delay time for issuing a subsequent request to said output apparatus for the notification of the number of transmittable packets in accordance with the previous delay time and the number of transmittable packets obtained in response to the previous request.

10. A computer readable medium on which a program is recorded, the program for a printing system which comprises an information processing apparatus and an output apparatus for performing a printing operation in accordance with data supplied from said information processing apparatus, the program comprising the steps of controlling communications between said information processing apparatus and said output apparatus by checking a number of transmittable packets in each of a plurality of communication channels provided between said information processing apparatus and said output apparatus;

issuing a request to instruct said output apparatus to notify said information processing apparatus of a number of transmittable packets in a case where there is no packet transmittable to said output apparatus from said information processing apparatus;

responding to the request for the notification of the number of transmittable packets after a lapse of a predetermined delay time; and adjusting the delay time for responding to a subsequent request from said information processing apparatus for the notification of the number of transmittable packets in accordance with the previous delay time or the number of transmittable packets obtained in response to the previous request.

11. A computer readable medium on which a program is recorded, the program for a printing system which comprises an information processing apparatus and an output apparatus for performing a printing operation, the program comprising the steps of:

controlling communications between said information processing apparatus and said output apparatus by checking a number of transmittable packets in each of a plurality of communication channels provided between said information processing apparatus and said output apparatus;

issuing a request, after a lapse of a predetermined delay time, to instruct said information processing apparatus to notify said output apparatus of a number of transmittable packets in a case where there is no packet transmittable to said information processing apparatus from said output apparatus; and adjusting the delay time for issuing a subsequent request to said information processing apparatus for the notification of the number of transmittable packets in accordance with the previous delay time or the number of transmittable packets obtained in response to the previous request.

12. A computer readable medium on which a program is recorded, the program for a printing system which comprises an information processing apparatus and an output apparatus for performing a printing operation, the program comprising the steps of:

controlling communications between said information processing apparatus and said output apparatus by checking a number of transmittable packets in each of a plurality of communication channels provided between said information processing apparatus and said output apparatus;

issuing a request to instruct said information processing apparatus to notify said output apparatus of a number of transmittable packets in a case where there is no packet transmittable to said information processing apparatus from said output apparatus;

responding to the request for the notification of the number of transmittable packets after a lapse of a predetermined delay time; and adjusting the delay time for responding to a subsequent request from said output apparatus for the notification of the number of transmittable packets in accordance with the previous delay time or the number of transmittable packets notified in response to the previous request.

13. An information processing apparatus for communicating with an external apparatus, said information processing comprising:

control means for controlling communication between said information processing apparatus and said external apparatus by checking a number of transmittable packets in each of communication channels provided between said information processing apparatus and said external apparatus; and adjusting means for issuing a request, after a lapse of a predetermined delay time, to instruct said external apparatus to notify said information processing apparatus of a number of transmittable packets in a case where there is no packet transmittable from said information processing apparatus, and for adjusting the delay time for issuing a subsequent request to said external apparatus for the notification of the number of transmittable packets in accordance with the previous delay time or the number of transmittable packets obtained in response to the previous request.

14. An information processing apparatus for communicating with an external apparatus, said information processing comprising:

control means for controlling communication between said information processing apparatus and said external apparatus by checking a number of transmittable packets in each of communication channels provided between said information processing apparatus and said external apparatus;

receiving means for receiving a request to instruct said information processing apparatus to notify said external apparatus of a number of transmittable packets;

responding means for responding to the request for notification of the number transmittable packets after a lapse of a predetermined delay time; and adjusting means for adjusting the delay time for responding to a subsequent request from said external apparatus for the notification of the number of transmittable packets in accordance with the previous delay time or the number of transmittable packets notified in response to the previous request.

15. A control method for communicating between an information processing apparatus and an external apparatus, said control method comprising the steps of:

controlling communication between said information processing apparatus and said external apparatus by checking a number of transmittable packets in each of communication channels provided between said information processing apparatus and said external apparatus;

issuing a request, after a lapse of a predetermined delay time, to instruct said external apparatus to notify said information processing apparatus of a number of transmittable packets in a case where there is no packet transmittable to said external apparatus from said information processing apparatus; and adjusting the delay time for issuing a subsequent request to said external apparatus for the notification of the number of transmittable packets in accordance with the previous delay time or the number of transmittable packets obtained in response to the previous request.

16. A control method for communicating between an information processing apparatus and an external apparatus, said control method comprising the steps of:

controlling communication between said information processing apparatus and said external apparatus by checking a number of transmittable packets in each communication channels provided between said information processing apparatus and said external apparatus;

receiving a request to instruct said information processing apparatus to notify said external apparatus of a number of transmittable packets;

responding to the request for notification of the number of transmittable packets after a lapse of a predetermined delay time; and adjusting the delay time for responding to a subsequent request from said external apparatus for the notification of the number of transmittable packets in accordance with the previous delay time or the number of transmittable packets notified in response to the previous request.

* * * * *